US005872188A

United States Patent [19]
Datta et al.

[11] Patent Number: 5,872,188
[45] Date of Patent: Feb. 16, 1999

[54] VULCANIZED RUBBER COMPOSITIONS COMPRISING ANTI-REVERSION COAGENT AND A SULFIDE RESIN

[75] Inventors: Rabindra Nath Datta, Deventer; Arie Jacob de Hoog, Ugchelen; Johannes Hermanus Wilbrink, Bathmen, all of Netherlands

[73] Assignee: Akzo Nobel nv, Arnhem, Netherlands

[21] Appl. No.: 556,958

[22] PCT Filed: Jun. 3, 1994

[86] PCT No.: PCT/EP94/01811

§ 371 Date: Dec. 11, 1995

§ 102(e) Date: Dec. 11, 1995

[87] PCT Pub. No.: WO94/29380

PCT Pub. Date: Dec. 22, 1994

[30] Foreign Application Priority Data

Jun. 14, 1993 [EP] European Pat. Off. .............. 93201696

[51] Int. Cl.$^6$ .............. C08L 81/00; C08L 19/00
[52] U.S. Cl. .............. 525/150; 525/189; 525/332.6
[58] Field of Search .............. 525/150, 189, 525/331.8, 332.6

[56] References Cited

U.S. PATENT DOCUMENTS

| | | |
|---|---|---|
| 2,422,156 | 6/1947 | Wolf et al. . |
| 3,968,062 | 7/1976 | Ecsedy . |
| 3,974,163 | 8/1976 | Yaucher et al. . |
| 3,992,362 | 11/1976 | Martin . |
| 4,308,180 | 12/1981 | Okamura .............. 525/135 |
| 4,873,290 | 10/1989 | Allen et al. .............. 525/337 |

FOREIGN PATENT DOCUMENTS

| | | | |
|---|---|---|---|
| 738500 | 7/1966 | Canada .............. 400/78 | |
| 5 8013 648 | 7/1981 | Japan . | |
| 6 1051 041 | 8/1984 | Japan . | |
| 2 044 786 | 10/1980 | United Kingdom .............. C08G 75/00 | |
| WO 92/07828 | 5/1992 | WIPO . | |
| WO 92/07904 | 5/1992 | WIPO . | |

OTHER PUBLICATIONS

Alkylphenol Sulfides as Vulcanizing Agents, G. M. Wolf, et al. *Sharles Chemicals, Inc.,* Wyandote, Michigan, pp. 1157–1166 Nov. 1946.

Hoffman Rubber Technology Handbook, *Hanser Publishers,* pp. 136–138, 1989.

Hoffman Rubber Technology Handbook, Chapter 4, Rubber Chemicals and Additives pp. 217–353, *Hanser Publishers,* 1989.

The Synthesis of Bisitaconamic Acids and Isomeric Bisimide Monomers, *Journal of Polymer Science:* Polymer Chemistry Edition, vol. 20, 233–239 (1982).

The Synthesis of Biscitraconimides and Polybiscitraconimides, Anthony V. Galanti, *Journal of Polymer Science:* Polymer Chemistry Edition, vol. 19, 451–475 (1981).

Synthesis of N–Substitued Bisitaconimide Monomers for Use as Thermosetting Polyimide Resins, S.L. Hartford, et al., *Journal of Polymer Science:* Polymer Chemistry Edition, vol. 16 137–153 (1978).

*Primary Examiner*—Christopher Henderson
*Attorney, Agent, or Firm*—Ralph J. Mancini

[57] ABSTRACT

A rubber composition which is the vulcanization reaction product of a rubber, particular anti-reversion coagents, and a sulfide resin, is disclosed. The invention also relates to a vulcanization process which is carried out in the presence of an anti-reversion coagent and a sulfide resin and the use of an anti-reversion coagent in combination with sulfide resin in a process for the vulcanization of rubber. The resulting vulcanized rubbers have significantly improved physical properties.

6 Claims, No Drawings

VULCANIZED RUBBER COMPOSITIONS COMPRISING ANTI-REVERSION COAGENT AND A SULFIDE RESIN

This invention relates to a vulcanized rubber composition having improved physical and mechanical properties. More particularly, it relates to a rubber composition which is vulcanized in the presence of an anti-reversion coagent and a sulfide resin. The invention also relates to a vulcanization process which is carried out in the presence of an anti-reversion coagent and a sulfide resin and the use of an anti-reversion coagent in combination with a sulfide resin in the vulcanization of rubber. Finally, the invention also relates to rubber products comprising rubber vulcanized in the presence of an anti-reversion coagent and a sulfide resin.

In the tire and belt industries, among others, a better resistance to reversion is being demanded. This curing characteristic results in improved mechanical and heat resistance properties.

It has been observed that the sulfur-vulcanization of a composition comprising a rubber and an anti-reversion coagent comprising at least two groups selected from citraconimide and/or itaconimide groups results in a substantial reduction in the reversion of sulfur-vulcanized rubber compositions. This concept is generally disclosed in PCT patent applications WO 92/07904 and 92/07828.

However, these sulfur-vulcanized rubber products still require improvement in physical and mechanical properties, such as tensile properties, heat resistance, and dynamic properties.

It is therefore the primary object of the present invention to improve upon the compositions disclosed by WO 92/07904 and 92/07828 by providing a sulfide resin which will solve the problems associated with these compositions. It has been found that the presence of a sulfide resin during vulcanization of rubber with an anti-reversion coagent results in improved physical and mechanical properties.

For example, the heat resistance of the rubber is improved by the presence of sulfide resin during vulcanization. Also, a decrease of loss compliance (J") is established. This property leads to tires with a reduced rolling resistance. No detrimental effects on the properties have been observed as a result of the use of a sulfide resin in rubber compositions.

Accordingly, the present invention relates to a vulcanized rubber composition which comprises the vulcanization reaction product of a composition containing at least:

A) 100 parts by weight of at least one natural or synthetic rubber;
B) 0 to 25 parts by weight of sulfur and/or a sufficient amount of a sulfur donor to provide the equivalent of 0 to 25 parts by weight of sulfur;
C) 0.1 to 5 parts by weight of at least one anti-reversion coagent comprising at least two groups selected from citraconimide and/or itaconimide groups; and
D) 0.1 to 25 parts by weight of at least one sulfide resin of the general formula $HZ_1-[-S_x-Z_2-]_n-S_x-Z_3H$, wherein $Z_1$, $Z_2$, and $Z_3$ are independently selected from linear or branched $C_{1-18}$ alkylene groups, $C_{2-18}$ alkenylene groups, $C_{2-18}$ alkynylene groups, $C_{6-18}$ arylene groups, $C_{7-30}$ alkarylene groups, $C_{7-30}$ aralkylene groups, $C_{3-18}$ cycloalkylene groups, optionally containing one or more hetero atoms; optionally substituted with hydroxy, amino, thiol, and halogen groups; each x is independently selected from an integer of 1 to 10; and n is an integer from 1 to 100.

Each sulfide link $S_x$ in the above-mentioned general formula may be a linear linkage of sulfur atoms, such as —S—, —S—S—, —S—S—S—, etc., but also

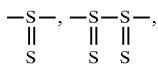

etc.

In a preferred embodiment the sulfide resin is of the following formula (I)

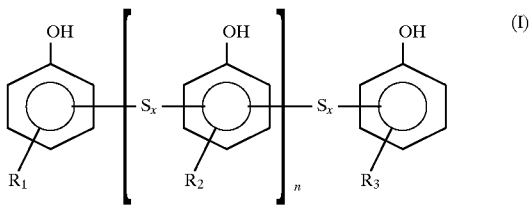

wherein R1, R2, and R3 are independently selected from linear or branched $C_{1-10}$ alkyl groups, each x is independently selected from an integer of 1 to 10, and n is an integer from 1 to 100. $R_1$, $R_2$, and $R_3$ are preferably tertiary alkyl groups, meta- or para-substituted on the aromatic group with respect to the hydroxy group. More preferably, $R_1$, $R_2$, and $R_3$ are para-substituted with respect to the hydroxy group. The sulfide resin is then a para-tertiary alkyl phenol sulfide.

In U.S. Pat. No. 2,422,156 the preparation of para-tertiary alkyl phenol sulfides is described starting from para-tertiary alkyl phenol and a sulfide compound, such as sulfur dichloride or sulfur monochloride. The symbol x in formula (I) depends upon how much sulfur is introduced in the reaction. Using sulfur dichloride, x would be 1, using sulfur monochloride, x would be 2. If a tri- or higher sulfide is desired the product can be further reacted with elemental sulfur.

Examples of para-tertiary alkyl phenol sulfide include the Vultac® compounds, ex. Pennwalt, which are para-tertiary amyl phenol disulfides. $R_1$, $R_2$, and $R_3$ are then tertiary amyl groups. The exact structure of these products is not known. It is believed that they are complex mixtures of sulfide resins, comprising mono-, di-, and polysulfide linkages.

Alkyl phenol sulfides are known as vulcanizing agents from different publications including Wolf, G. M., et al., Ind. & Eng. Chem., 38, 1946, pp.1157–1166, U.S. Pat. Nos. 2,422,156, 3,968,062, 3,992,362, and 4,873,290, and Japanese patent applications 5 8013 648 and 6 1051 041. However, in these publications it is neither disclosed nor suggested that the presence of sulfide resins in compositions comprising a rubber and an anti-reversion coagent comprising at least two groups selected from citraconimide and/or itaconimide would show the unexpected and significant results as in the present invention.

In another preferred embodiment $Z_1$, $Z_2$, and $Z_3$ are substituted or unsubstituted, linear or branched $C_{1-10}$ alkylene groups, optionally containing one or more hetero atoms, such as for example oxygen. Examples of these compounds include ethyleneformal-polysulfide polymer (Thiokol® FA) and the condensation product of (2-chloroethyl)formal and $Na_2S_x$ (Thiokol® ST).

Thiokol® polymers are known from W. Hofmann, "Rubber Technology Handbook", Chapter 3, Rubber Chemicals and Additives, pp. 136–138, Hanser Publishers, Munich 1989. On page 233 of this handbook it is mentioned that Thiokol® polymers could be used as sulfur donors instead of sulfur, however, no particular advantages are named. It is also said that, in practice, the Thiokols® are not used as sulfur donors. Accordingly, the present invention is not disclosed or suggested by Hofmann.

In addition, the use of some sulfur-containing citraconimides in sulfur vulcanization is known from U.S. Pat. No. 3,974,163. These compounds inhibit premature vulcanization of diene rubbers, optionally in the presence of vulcanization accelerators. However, the compositions of the present invention and their particular advantages are neither disclosed nor suggested by this publication.

Finally, in Canadian Patent no. 738,500 the vulcanization of rubbers in the absence of sulfur, with either bis-maleimides or bis-citraconimides, is disclosed. This process had, for its purpose, to be an alternative to sulfur-vulcanization processes. However, the rubber products made by the process of this patent suffer from the usual disadvantages of peroxide-cured rubbers such as low tensile strength and significant deterioration in other important properties.

The present invention is applicable to all natural and synthetic rubbers. Examples of such rubbers include, but are not limited to, natural rubber, styrene-butadiene rubber, butadiene rubber, isoprene rubber, acrylonitrile-butadiene rubber, chloroprene rubber, isoprene-isobutylene rubber, brominated isoprene-isobutylene rubber, chlorinated isoprene-isobutylene rubber, ethylene-propylene-diene terpolymers, as well as combinations of two or more of these rubbers and combinations of one or more of these rubbers with other rubbers and/or thermoplastics.

The anti-reversion coagents used in the present invention comprise at least two groups selected from citraconimide and itaconimide. More preferably, the anti-reversion coagents are compounds represented by the general formula II:

wherein D, optionally containing one or more groups selected from nitrogen, oxygen, silicon, phosphorus, boron, sulphone, sulphoxy, polysulfide and sulfur, is a monomeric or oligomeric divalent, trivalent or tetravalent group, p is an integer selected from 1, 2 or 3, $Q_1$ and $Q_2$ are independently selected from the formulas III and IV:

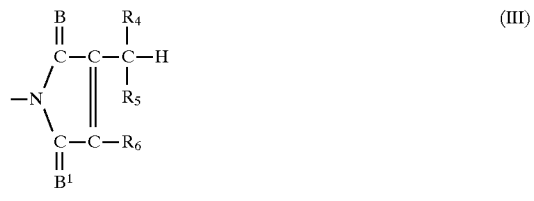

and

wherein $R_4$, $R_5$ and $R_6$ are independently selected from hydrogen, $C_1$–$C_{18}$ alkyl groups, $C_3$–$C_{18}$ cycloalkyl groups, $C_6$–$C_{18}$ aryl groups, $C_7$–$C_{30}$ aralkyl groups and $C_7$–$C_{30}$ alkaryl groups and $R_5$ and $R_6$ may combine to form a ring when $R_4$ is hydrogen; B and $B^1$ are independently selected from oxygen and sulfur.

The imides used in the present invention are, in general, known compounds and may be prepared by the methods disclosed in, Galanti, A. V. et al., J. Pol. Sc.: Pol. Chem. Ed., Vol. 19, pp. 451–475, (1981); Galanti, A. V. et al., J. Pol. Sc.: Pol. Chem. Ed., Vol. 20, pp. 233–239 (1982); and Hartford, S. L. et al., J. Pol. Sc.: Pol. Chem. Ed., Vol. 16, pp. 137–153, 1978, the disclosures of which are hereby incorporated by reference.

The imide compounds useful in the present invention and represented by the formula II are, more preferably, the biscitraconimides wherein $Q_1$ and $Q_2$ are of the formula III, $R_4=R_5=R_6=H$, p=1 and $B=B^1$=oxygen; the bisitaconimides wherein $Q_1$ and $Q_2$ are of the formula IV, $R_4=R_5=R_6=H$, p=1 and $B=B^1$=oxygen; the mixed citraconimide and itaconimide wherein $Q_1$ is of the formula III, $Q_2$ is of the formula IV, $R_4=R_5=R_6=H$, p=1 and $B=B^1$=oxygen; and mixtures of the above-mentioned compounds.

More specifically, the group D mentioned in the formula II can be a monomeric divalent, trivalent or tetravalent linear or branched radical chosen from a $C_1$–$C_{18}$ alkyl, $C_2$–$C_{18}$ alkenyl, $C_2$–$C_{18}$ alkynyl, $C_3$–$C_{18}$ cycloalkyl, $C_3$–$C_{18}$ polycycloalkyl, $C_6$–$C_{18}$ aryl, $C_6$–$C_{30}$ polyaryl, $C_7$–$C_{30}$ aralkyl, $C_7$–$C_{30}$ alkaryl, oligomers of one or more of these radicals, and which radicals may optionally contain one or more groups selected from oxygen, nitrogen, silicon, phosphorus, sulfur, polysulfide, sulphone, sulfoxy and boron, all of which radicals may also be optionally substituted at one or more of the atoms in the radical with a substituent selected from oxygen, nitrogen, silicon, $SiO_2$, sulfoxy, boron, sulfur, phosphorus, amido, imino, azo, diazo, hydrazo, azoxy, alkoxy, hydroxy, iodine, fluorine, bromine, chlorine, carbonyl, carboxy, ester, carboxylate, $SO_2$, $SO_3$, sulphonamido, $SiO_3$, nitro, imido, thiocarbonyl, cyano, and epoxy groups.

More specific examples of some of the imide compounds useful in the present invention can be found in international patent application publication numbers WO 92/07904 and 92/07828, the disclosures of which are hereby incorporated by reference.

In a preferred embodiment, the composition is sulfur-vulcanized. More particularly, 0.1 to 25 parts by weight of sulfur and/or a sufficient amount of a sulfur donor to provide the equivalent of 0.1 to 25 parts by weight of sulfur is present in the composition.

Examples of sulfur which may be used in the present invention include various types of sulfur such as powdered sulfur, precipitated sulfur and insoluble sulfur. Also, sulfur donors may be used in place of, or in addition to sulfur in order to provide the required level of sulfur during the vulcanization process. Examples of such sulfur donors include, but are not limited to, tetramethylthiuram disulfide, tetraethylthiuram disulfide, tetrabutylthiuram disulfide, tetrabenzylthiuram disulfide, dipen-tamethylene thiuram hexasulfide, dipentamethylene thiuram tetrasulfide, dithiodimorpholine, caprolactam disulfide, dialkylthiophosphoryl disulfide, and mixtures thereof.

The amount of sulfur which may be compounded with the rubber is, based on 100 parts of rubber, preferably 0.1 to 25 parts by weight, and more pre-ferably 0.2 to 8 parts by weight. The amount of sulfur donor which may be compounded with the rubber is an amount sufficient to provide an equivalent amount of sulfur which is the same as if sulfur itself were used.

The amount of anti-reversion coagent to be compounded with the rubber is, based on 100 parts of rubber, 0.1 to 5 parts by weight, and more preferably 0.2 to 3 parts by weight.

The amount of sulfide resin to be compounded with the rubber is, based on 100 parts of rubber, 0.1 to 8 parts. More preferably, 0.2 to 1.5 parts of sulfide resin per 100 parts of rubber are employed.

These ingredients may be employed as a pre-mix, or added simultaneously or separately, and they may be added together with other rubber compounding ingredients as well.

In most circumstances it is also desirable to have a vulcanization accelerator in the rubber compound.

Conventional, known vulcanization accelerators may be employed. The preferred vulcanization accelerators include mercaptobenzothiazole, 2,2'-mercaptobenzothiazole disulfide, sulfenamide accelerators including N-cyclohexyl-2-benzothiazole sulfenamide, N-tertiary-butyl-2-benzothiazole sulfenamide, N,N'-dicyclohexyl-2-benzothiazole sulfenamide, and 2-(morpholinothio) benzothiazole; thiophosphoric acid derivative accelerators, thiurams, dithiocarbamates, diphenyl guanidine, diorthotolyl guanidine, dithiocarbamylsulfenamides, xanthates, triazine accelerators and mixtures thereof.

When the vulcanization accelerator is employed, quantities of from 0.1 to 8 parts by weight, based on 100 parts by weight of rubber composition, are used. More preferably, the vulcanization accelerator comprises 0.3 to 4 parts by weight, based on 100 parts by weight of rubber.

Other conventional rubber additives may also be employed in their usual amounts. For example, reinforcing agents such as carbon black, silica, clay, whiting and other mineral fillers, as well as mixtures of fillers, may be included in the rubber composition. Other additives such as process oils, tackifiers, waxes, antioxidants, antiozonants, pigments, resins, plasticizers, process aids, factice, compounding agents and activators such as stearic acid and zinc oxide may be included in conventional, known amounts. For a more complete listing of rubber additives which may be used in combination with the present invention see, W. Hofmann, "Rubber Technology Handbook, Chapter 4, Rubber Chemicals and Additives, pp. 217–353, Hanser Publishers, Munich 1989.

Further, scorch retarders such as phthalic anhydride, pyromellitic anhydride, benzene hexacarboxylic trianhydride, 4-methylphthalic anhydride, trimellitic anhydride, 4-chlorophthalic anhydride, N-cyclohexylthiophthalimide, salicylic acid, benzoic acid, maleic anhydride and N-nitrosodiphenylamine may also be included in the rubber composition in conventional, known amounts. Finally, in specific applications it may also be desirable to include steel-cord adhesion promoters such as cobalt salts and dithiosulfates in conventional, known quantities.

The present invention also relates to a vulcanization process which comprises the step of vulcanizing 100 parts of at least one natural or synthetic rubber in the presence of 0.1–5 parts by weight of an anti-reversion coagent and 0.1–25 parts by weight of a sulfide resin.

The process is carried out at a temperature of 110°–220° C. over a period of up to 24 hours. More preferably, the process is carried out at a temperature of 120°–190° C. over a period of up to 8 hours in the presence of 0.1–25 parts by weight of sulfur and/or sulfur donor to provide the equivalent of 0.1 to 25 parts by weight of sulfur, 0.1 to 5 parts by weight of anti-reversion coagent and 0.1 to 8 parts by weight of sulfide resin. Even more preferable is the use of 0.2–8 parts by weight of sulfur and/or sulfur donor, 0.2–3 parts by weight of anti-reversion coagent with 0.2–1.5 parts by weight of sulfide resin. All of the additives mentioned above with respect to the rubber composition may also be present during the vulcanization process of the invention.

In a more preferred embodiment of the vulcanization process, the vulcanization is carried out at a temperature of 120°–190° C. over a period of up to 8 hours and in the presence of 0.1 to 8 parts by weight, based on 100 parts by weight of rubber, of at least one vulcanization accelerator.

In another preferred embodiment of the vulcanization process, the anti-reversion coagent is selected from a compound of the formula II.

The present invention also comprises the use of an anti-reversion coagent in combination with a sulfide resin in a process for the vulcanization of rubber.

Finally, the present invention also includes articles of manufacture, such as tires, belts or inner tubes which comprise vulcanized rubber which is vulcanized in the presence of an anti-reversion coagent and a sulfide resin. More particularly, the compositions of the present invention can be used in tire treads for truck tires and off-the-road tires, in particular, for sidewalls, for tire carcasses and for steel-cord skim stocks. In belts, the rubber compositions of the present invention are particularly useful for conveyor belts and V-belts which are subjected to high loading and abrasion in service.

The invention is further illustrated by the following examples which are not to be construed as limiting the invention in any way. The scope of the invention is to be determined from the claims appended hereto.

EXPERIMENTAL METHODS USED IN THE EXAMPLES

Compounding, Vulcanization and Characterization of Compounds

In the following examples, rubber compounding, vulcanization and testing was carried out according to standard methods except as otherwise stated:

Base compounds were mixed in a Werner & Pfleiderer mixer (volume 5.0 liter; 70% load factor; preheating at 50° C.; rotor speed 30 rpm; mixing time 6 min).

Vulcanization ingredients and coagents were added to the compounds on a Schwabenthan Polymix 150L two-roll mill (friction 1:1.22, temperature 40°–50° C., mixing time 10 min).

Cure characteristics were determined using a Monsanto rheometer MDR 2000E (range 2.5–3 Nm/arc 0.5°, ISO 6502-91): delta torque or extent of crosslinking (R∞) is the maximum torque (MH, also denoted as initial torque maximum, $T_i$) minus the minimum torque (ML). Scorch safety ($t_s2$) is the time to 2% of delta torque above minimum torque (ML), optimum cure time ($t_{90}$) is the time to 90% of delta torque above minimum.

Sheets and test specimens were vulcanized by compression molding in a Fontyne TP-400 press.

Tensile measurements were carried out using a Zwick 1445 tensile tester (ISO-37/2 dumbbells).

Hardness was determined according to ISO 2783 (°Shore A), and ISO 48 (IRHD).

Rebound resilience was measured at room temperature (RT=23 °C.) according to ASTM D 1054-87.

Abrasion was determined using a Zwick abrasion tester as volume loss per 40 m path travelled (ISO 4649).

Ageing of test specimens was carried out in a ventilated oven in the presence of air at 100° C. for 1 day or for 3 days (ISO 188). % retention and % modulus are calculated with respect to unaged species.

Heat build-up and permanent set after dynamic loading were determined using a Goodrich Flexometer (load 1 MPa, stroke 0.445 cm, frequency 30 Hz, start temperature 100° C., running time 30 min or start at room temperature (RT=23° C.), running time 60 min; ISO 4666/3-1982).

Dynamic mechanical analysis was carried out using a RDA-700 (prestrain 0.75%, frequency 15 Hz at 60° C. or 1 Hz at 0° or 20° C., ASTM D 2231). Storage modulus (G'), loss modulus (G"), and loss tangent (tanδ) are measured by dynamic mechanical analysis. Increased storage modulus (G') and decreased loss tangent (tanδ) result in a lower loss compliance (tanδ/G'=J") which leads to improved tire properties such as reduced rolling resistance (J. M. Collins et al., Trans. Inst. Rubber Ind. 40, T239, 1964), which by consequence leads to fuel savings during service.

EXAMPLES 1–3 AND COMPARATIVE EXAMPLES A–C

Natural rubber was vulcanized using formulations listed in Table 1. Comparative Example A was a control example with no anti-reversion coagent or sulfide resin.

TABLE 1

| Example No. | A | B | C | 1 | 2 | 3 |
|---|---|---|---|---|---|---|
| NR SMR CV | 100 | 100 | 100 | 100 | 100 | 100 |
| C. Black (N-330) | 50 | 50 | 50 | 50 | 50 | 50 |
| Zinc Oxide RS | 5 | 5 | 5 | 5 | 5 | 5 |
| Stearic Acid | 2 | 2 | 2 | 2 | 2 | 2 |
| Ar. Oil | 3 | 3 | 3 | 3 | 3 | 3 |
| CBS | 1.5 | 1.5 | 1.5 | 1.5 | 1.5 | 1.5 |
| Sulfur | 1.5 | 1.5 | 1.5 | 1.5 | 1.5 | 1.5 |
| BCI-MX | — | 0.6 | — | 0.6 | 0.6 | 0.6 |
| Vultac ® 5 | — | — | — | — | 0.5 | — |
| Vultac ® 7 | — | — | 0.5 | 0.5 | — | — |
| Vultac ® 710 | — | — | — | — | — | 0.5 |

Ar. Oil: aromatic oil Ingralen 150 ®
CBS: Perkacit CBS grs ®: n-cyclohexyl-2-benzothiazole sulfenamide
BCI-MX: N,N'-m-xylylene-bis-citraconimide
Vultac ® 5: alkylphenol disulfide containing 21% sulfur and 30% micro-Cel-E (a porous calcium silicate), ex Pennwalt
Vultac ® 7: alkylphenol disulfide containing 30.5% sulfur, ex Pennwalt
Vultac ® 710: alkylphenol disulfide containing 27.4% sulfur, ex Pennwalt

TABLE 2

Table 2 lists the cure characteristics of the compositions A–C and 1–3 obtained at 150° C. and 170° C. Values in parentheses designate the values obtained for the vulcanizates cured at 170° C.

| Example No. | A | B | C | 1 | 2 | 3 |
|---|---|---|---|---|---|---|
| Extent of crosslinking, R∞ (Nm) | 1.9 (1.7) | 1.9 (1.7) | 2.0 (1.8) | 2.0 (1.9) | 2.0 (1.9) | 2.0 (1.9) |
| retention of R∞ (%) compared to 150° C. | 91 | 91 | 92 | 94 | 94 | 94 |
| Scorch safety, $t_s2$ (min) | 5.0 (1.5) | 5.1 (1.5) | 4.1 (1.3) | 4.2 (1.3) | 4.2 (1.3) | 4.1 (1.3) |
| Optimum cure time, $t_{90}$ (min) | 9.6 (2.5) | 9.6 (2.5) | 8.3 (2.4) | 8.5 (2.4) | 8.4 (2.4) | 8.4 (2.4) |

The vulcanized rubbers were then tested for physical and mechanical properties.

TABLE 3

Table 3 lists the properties of the vulcanizates cured at 150° C. for $t_{90}$, for 60, 120, and 240 minutes. Values in parentheses designate respectively the values obtained for the vulcanizates cured at 150° C. for 60, 120, and 240 min.

| Test | A | B | C | 1 | 2 | 3 |
|---|---|---|---|---|---|---|
| Modulus 50% (MPa) | 1.7 (1.5) (1.4) (1.5) | 1.7 (1.5) (1.7) (1.7) | 1.8 (1.6) (1.6) (1.5) | 1.8 (1.8) (1.8) (1.8) | 1.8 (1.8) (1.7) (1.7) | 1.8 (1.8) (1.8) (1.7) |
| Modulus 100% (MPa) | 3.6 (3.0) (2.8) (2.8) | 3.5 (3.3) (3.4) (2.9) | 3.9 (3.3) (3.1) (2.9) | 4.0 (4.0) (3.9) (3.4) | 3.9 (3.7) (3.7) (3.4) | 3.9 (3.8) (3.7) (3.6) |
| Modulus 300% (MPa) | 18.9 (17.6) (16.1) (15.6) | 18.6 (18.3) (19.5) (18.9) | 19.8 (18.3) (16.8) (16.4) | 19.6 (19.4) (19.3) (18.5) | 18.9 (18.8) (18.7) (18.5) | 19.3 (19.2) (19.1) (18.8) |
| Tensile str. (MPa) | 28.6 (26.3) (24.7) (23.2) | 29.0 (27.7) (26.9) (24.9) | 29.3 (26.3) (26.4) (25.4) | 29.8 (28.5) (28.3) (27.4) | 29.5 (28.7) (28.3) (27.3) | 28.9 (28.1) (27.6) (27.2) |
| Elongation (%) | 450 (447) (430) (420) | 455 (440) (410) (405) | 445 (440) (450) (440) | 460 (420) (415) (410) | 465 (440) (420) (410) | 455 (420) (415) (410) |
| Abrasion (mm³) | 130 (136) | 132 (127) | 131 (132) | 124 (123) | 122 (124) | 123 (122) |
| Heat build up, 100° C. (ΔT, °C.) | 26 (30) | 22 (21) | 24 (28) | 21 (20) | 21 20 | 21 20 |

TABLE 4

Table 4 lists the properties of the vulcanizates cured at 170° C. for $t_{90}$, for 60, 120 minutes. Values in parentheses designate respectively the values obtained for the vulcanizates cured at 170° C. for 60, and 120 min.

| Test | A | B | C | 1 | 2 | 3 |
|---|---|---|---|---|---|---|
| Modulus 50% (MPa) | 1.6 (1.3) (1.3) | 1.5 (1.5) (1.6) | 1.7 (1.5) (1.4) | 1.8 (1.7) (1.7) | 1.8 (1.7) (1.7) | 1.7 (1.7) (1.6) |
| Modulus 100% (MPa) | 3.2 (2.4) (2.4) | 3.2 (3.3) (3.4) | 3.7 (2.8) (2.7) | 3.8 (3.6) (3.5) | 3.7 (3.5) (3.5) | 3.7 (3.5) (3.4) |
| Modulus 300% (MPa) | 16.6 (13.1) (12.6) | 17.3 (17.4) (18.0) | 18.2 (14.4) (14.2) | 18.7 (18.5) (17.7) | 17.9 (17.5) (17.4) | 18.6 (18.1) (18.0) |
| Tensile str. (MPa) | 28.1 (22.6) (22.1) | 28.8 (24.7) (25.4) | 28.6 (23.2) (22.1) | 29.7 (27.8) (25.8) | 29.5 (27.6) (26.9) | 29.5 (28.4) (25.9) |
| Elongation (%) | 495 (475) (455) | 485 (430) (420) | 477 (470) (420) | 490 (440) (445) | 490 (440) (445) | 490 (440) (420) |
| Abrasion (mm³) | 140 (165) | 130 (140) | 138 (169) | 124 (130) | 125 (130) | 126 (132) |
| Heat build up, 100° C. (ΔT, °C.) | 24 (34) | 19 (21) | 23 (32) | 19 (19) | 18 (19) | 18 (18) |

From the results in Tables 3–4 it is clear that compositions according to the invention show improved basic properties in the ultimate vulcanizates. More particularly, the compositions of the present invention show a retention of the modulus during overcure, retention or even improvement in tensile strength, and reduction of the heat build up, resulting in an improved heat resistance.

TABLE 5

Table 5 lists high temperature tensile strength for all compositions measured at 100° C.

| Test | A | B | C | 1 | 2 | 3 |
|---|---|---|---|---|---|---|
| Tensile str. (MPa) 150° C./60 min. | 18.6 | 20.5 | 18.7 | 22.1 | 22.6 | 22.4 |
| Tensile str. (MPa) 170° C./60 min. | 16.6 | 18.7 | 16.9 | 20.3 | 21.0 | 20.9 |

The results in Table 5 show that a high retention of tensile strength is observed for the compositions of the present invention.

Tables 6–7 show the results of the dynamic mechanical analyses of the compositions of the present invention 1–3 compared to the comparative compositions A–C.

TABLE 6

Dynamic-mechanical data of the compositions cured at 150° C. for $t_{90}$ and for 60 min. obtained at 60° C. and 15 Hz. Values in parentheses designate the properties of the compositions cured at 150° C. for 60 min.

| Samples | G' MPa | G" MPa | tanδ | J" $MPa^{-1}$ |
|---|---|---|---|---|
| A | 5.87 | 0.80 | 0.137 | 0.0229 |
|   | (6.20) | (0.91) | (0.147) | (0.0232) |
| B | 6.23 | 0.91 | 0.146 | 0.0229 |
|   | (6.12) | (0.87) | (0.142) | (0.0227) |
| C | 6.34 | 0.83 | 0.134 | 0.0202 |
|   | (5.62) | (0.80) | (0.141) | (0.0246) |
| 1 | 6.50 | 0.86 | 0.132 | 0.0200 |
|   | (6.14) | (0.76) | (0.124) | (0.0198) |
| 2 | 6.31 | 0.84 | 0.133 | 0.0207 |
|   | (5.83) | (0.73) | (0.125) | (0.0212) |
| 3 | 6.56 | 0.88 | 0.132 | 0.0201 |
|   | (5.34) | (0.61) | (0.113) | (0.0211) |

TABLE 7

Dynamic-mechanical data of the compositions cured at 170° C. for $t_{90}$ and for 60 min. obtained at 60° C. and 15 Hz. Values in the parentheses designate the properties of the compositions cured at 170° C. for 60 min.

| Samples | G' MPa | G" MPa | tanδ | J" $MPa^{-1}$ |
|---|---|---|---|---|
| A | 5.41 | 0.72 | 0.133 | 0.0232 |
|   | (4.81) | (0.81) | (0.169) | (0.0350) |
| B | 5.05 | 0.65 | 0.129 | 0.0227 |
|   | (4.98) | (0.68) | (0.136) | (0.0268) |
| C | 5.72 | 0.72 | 0.126 | 0.0246 |
|   | (5.42) | (0.79) | (0.145) | (0.0263) |
| 1 | 6.20 | 0.72 | 0.116 | 0.0187 |
|   | (6.12) | (0.72) | (0.117) | (0.0191) |
| 2 | 6.06 | 0.70 | 0.115 | 0.0190 |
|   | (5.89) | (0.70) | (0.118) | (0.0200) |
| 3 | 6.08 | 0.72 | 0.118 | 0.0194 |
|   | (5.95) | (0.72) | (0.121) | (0.0203) |

From the results in Tables 6–7 it is clear that the use of the compositions of the present invention in tires improves several properties. This is especially shown for the loss compliance which is decreased significantly for the compositions of the present invention, resulting in a reduced rolling resistance. The changes produced by overcure are minimized with the compositions of the present invention.

EXAMPLES 4–5 AND COMPARATIVE EXAMPLES D–G

Examples 4–5 and Comparative Examples D–G are formulations for truck tire treads. The components of each formulation are given in Table 8, the cure characteristics of these formulations are listed in Table 9, the physical and mechanical properties for different curing and ageing conditions are given in Tables 10–16, and the dynamic mechanical data are listed in Tables 17–20. Comparative Example D was a control example with no anti-reversion coagent or sulfide resin.

The rubber compounding took place in the following order. Base compounds were mixed in a Farrel Bridge BR 1.6 liter Banbury type internal mixer (preheating at 50° C., rotor speed 77 rpm, mixing time 6 min with full cooling). Vulcanization ingredients and coagents were added to the compounds on a Schwabenthan Polymix 150L two-roll mill (friction 1:1.22, temperature 70° C., 3 min).

TABLE 8

| Ingredient | D | E | F | G | 4 | 5 |
|---|---|---|---|---|---|---|
| NR SMR CV | 80 | 80 | 80 | 80 | 80 | 80 |
| BR Buna CB 10 | 20 | 20 | 20 | 20 | 20 | 20 |
| Carbon Black N-375 | 55 | 55 | 55 | 55 | 55 | 55 |
| Stearic Acid | 2 | 2 | 2 | 2 | 2 | 2 |
| ZnO RS | 4 | 4 | 4 | 4 | 4 | 4 |
| Ar.Oil | 8 | 8 | 8 | 8 | 8 | 8 |
| 6PPD | 2 | 2 | 2 | 2 | 2 | 2 |
| CBS | 1.2 | 1.2 | 1.2 | 1.2 | 1.2 | 1.2 |
| Sulphur | 1.2 | 1.2 | 1.2 | 1.2 | 1.2 | 1.2 |
| Coagent BCI-MX | — | 0.6 | — | — | 0.5 | 0.5 |
| Vultac ® 7 | — | — | 0.5 | — | 0.5 | — |
| Vultac ® 710 | — | — | — | 0.5 | — | 0.5 |

Ar. Oil: Aromatic Oil Dutrex 729 HP ®
6PPD: Permanax 6PPD rd ®: N-1,3-dimethylbutyl-N'-phenyl-p-phenylene diamine
CBS: Perkacit CBS pd ®: n-cyclohexyl-2-benzothiazole sulfenamide
BCI-MX: N,N'-m-xylylene-bis-citraconimide
Vultac ® 7: alkylphenol disulfide containing 30.5% sulfur, ex Pennwalt
Vultac ® 710: alkylphenol disulfide containing 27.4% sulfur, ex Pennwalt

TABLE 9

Table 9 lists the cure characteristics of the compositions D–G and 4–5 obtained at 150° C. and 170° C. Values in parentheses designate the values obtained for the vulcanizates cured at 170° C.

| Example No. | D | E | F | G | 4 | 5 |
|---|---|---|---|---|---|---|
| Extent of crosslinking, R∞ (Nm) | 1.5 (1.4) | 1.5 (1.4) | 1.6 (1.5) | 1.6 (1.5) | 1.6 (1.6) | 1.7 (1.6) |
| retention of R∞ (%) compared to 150° C. | 92 | 92 | 93 | 93 | 95 | 95 |
| Scorch safety, $t_s^2$ (min) | 6.7 (2.0) | 6.7 (2.0) | 5.0 (1.5) | 4.9 (1.5) | 5.3 (1.6) | 5.2 (1.5) |
| Optimum cure time, $t_{90}$ (min) | 10.6 (3.1) | 11.7 (3.1) | 8.9 (2.7) | 9.1 (2.7) | 10.0 (2.7) | 9.7 (2.6) |

The results in Table 9 show a significantly higher crosslink density for the compositions of the present invention. In addition, the retention of R∞ at 170° C. is excellent.

TABLE 10

Table 10 lists the properties of the vulcanizates cured at 150° C. for $t_{90}$ and for 60 minutes. Values in parentheses designate the values obtained for the vulcanizates cured at 150° C. for 60 min.

| Test | D | E | F | G | 4 | 5 |
|---|---|---|---|---|---|---|
| Modulus 50% (MPa) | 1.4 (1.2) | 1.4 (1.4) | 1.5 (1.4) | 1.5 (1.4) | 1.5 (1.5) | 1.6 (1.6) |
| Modulus 100% (MPa) | 2.4 (2.0) | 2.5 (2.4) | 2.8 (2.5) | 2.8 (2.4) | 2.8 (2.7) | 3.1 (3.1) |
| Modulus 300% (MPa) | 12.9 (11.2) | 13.5 (13.2) | 14.6 (13.8) | 14.3 (13.1) | 13.9 (13.8) | 15.3 (15.3) |
| Tensile str. (MPa) | 27.9 (25.5) | 28.2 (27.0) | 27.4 (25.7) | 27.5 (26.1) | 29.5 (28.0) | 29.3 (28.5) |
| Hot tensile (MPa) | 23.6 (21.6) | 23.8 (21.5) | 23.4 (21.2) | 23.2 (21.0) | 24.7 (22.4) | 24.6 (22.6) |
| Elongation (%) | 550 (585) | 560 (545) | 550 (525) | 560 (550) | 550 (520) | 525 (525) |
| Abrasion ($mm^3$) | 128 (148) | 115 (141) | 120 (171) | 125 (179) | 98 (121) | 90 (120) |
| Heat build up, 100° C. (ΔT, °C.) | 50 (53) | 44 (41) | 40 (48) | 44 (50) | 30 (34) | 28 (29) |
| Permanent set (%) | 20.4 (20.6) | 19.1 (13.3) | 14.1 (16.7) | 15.3 (15.9) | 13.5 (10.5) | 13.0 (8.0) |

TABLE 11

Table 11 lists the properties of the vulcanizates cured at 170° C. for $t_{90}$ and for 60 minutes. Values in parentheses designate the values obtained for the vulcanizates cured at 170° C. for 60 min.

| Test | D | E | F | G | 4 | 5 |
|---|---|---|---|---|---|---|
| Modulus 50% (MPa) | 1.2 (1.1) | 1.3 (1.4) | 1.4 (1.2) | 1.4 (1.2) | 1.5 (1.4) | 1.5 (1.5) |
| Modulus 100% (MPa) | 2.2 (1.7) | 2.3 (2.4) | 2.5 (2.0) | 2.5 (1.9) | 2.6 (2.5) | 2.8 (2.7) |
| Modulus 300% (MPa) | 12.0 (8.9) | 12.3 (12.7) | 13.4 (10.4) | 13.5 (10.2) | 13.3 (13.3) | 14.1 (14.1) |
| Tensile str. (MPa) | 26.4 (19.6) | 27.8 (23.5) | 26.6 (21.3) | 25.6 (21.0) | 28.7 (25.5) | 28.8 (25.4) |
| Hot tensile (MPa) | 22.4 (15.2) | 23.6 (18.0) | 22.8 (15.6) | 23.0 (15.4) | 24.6 (18.8) | 24.5 (18.6) |
| Elongation (%) | 600 (560) | 590 (510) | 555 (530) | 580 (530) | 550 (510) | 540 (520) |
| Abrasion (mm³) | 133 —*) | 136 (132) | 123 —*) | 121 —*) | 100 (120) | 90 (115) |
| Heat build up, 100° C. (ΔT, °C.) | 51 (53) | 47 (36) | 48 (49) | 48 (51) | 39 (32) | 32 (29) |
| Permanent set (%) | 19.6 (17.8) | 19.6 (8.1) | 20.7 (15.4) | 20.4 (16.5) | 20.2 (7.5) | 21.5 (5.2) |

*) These samples were too soft to be measured properly

From the results in Tables 10–11 it is clear that compositions according to the invention show improved basic properties in the ultimate vulcanizates. More particularly, the compositions of the present invention show a retention of the modulus during overcure, improvement in tensile strength, and reduction of the heat build up and permanent set, resulting in an improved heat resistance.

TABLE 12

Table 12 lists the mechanical properties of the vulcanizates cured at 150° C. for $t_{90}$ and for 60 minutes and subsequently aged for 1 day at 100° C. Values in parentheses designate the values obtained for the vulcanizates cured at 150° C. for 60 min.

| Test | D | E | F | G | 4 | 5 |
|---|---|---|---|---|---|---|
| Modulus 50% (MPa) | 1.8 (1.4) | 1.8 (1.7) | 2.0 (1.6) | 2.0 (1.6) | 2.0 (1.7) | 2.1 (1.9) |
| Modulus 100% (MPa) | 3.5 (2.4) | 3.4 (3.0) | 3.9 (2.9) | 3.8 (2.8) | 3.9 (3.3) | 4.0 (3.7) |
| Modulus 300% (MPa) | 16.4 (11.9) | 16.6 (15.4) | 17.8 (15.1) | 17.5 (14.0) | 16.8 (16.1) | 17.5 (17.1) |
| Tensile str. (MPa) | 27.3 (22.6) | 26.8 (24.2) | 27.7 (23.0) | 27.5 (23.4) | 28.5 (25.5) | 28.7 (25.9) |
| Elongation (%) | 485 (505) | 465 (445) | 460 (450) | 460 (480) | 420 (450) | 430 (450) |
| % retention tensile strength | 98 (88) | 95 (90) | 101 (89) | 100 (89) | 96 (91) | 98 (91) |
| % 100% modulus increase | +44 (+17) | +34 (+24) | +36 (+16) | +37 (+15) | +40 (+23) | +31 (+19) |

TABLE 13

Table 13 lists the mechanical properties of the vulcanizates cured at 170° C. for $t_{90}$ and for 60 minutes and subsequently aged for 1 day at 100° C. Values in parentheses designate the values obtained for the vulcanizates cured at 170° C. for 60 min.

| Test | D | E | F | G | 4 | 5 |
|---|---|---|---|---|---|---|
| Modulus 50% (MPa) | 1.7 (1.3) | 1.7 (1.5) | 1.9 (1.4) | 1.9 (1.3) | 2.0 (1.7) | 1.9 (1.7) |
| Modulus 100% (MPa) | 3.4 (2.1) | 3.3 (2.7) | 3.7 (2.4) | 3.7 (2.3) | 3.6 (3.1) | 3.7 (3.1) |

TABLE 13-continued

Table 13 lists the mechanical properties of the vulcanizates cured at 170° C. for $t_{90}$ and for 60 minutes and subsequently aged for 1 day at 100° C. Values in parentheses designate the values obtained for the vulcanizates cured at 170° C. for 60 min.

| Test | D | E | F | G | 4 | 5 |
|---|---|---|---|---|---|---|
| Modulus 300% (MPa) | 16.1 (18.4) | 16.2 (21.4) | 17.2 (17.2) | 17.2 (18.9) | 17.6 (23.5) | 17.3 (24.0) |
| Tensile str. (MPa) | 26.3 (18.4) | 27.4 (21.4) | 26.5 (17.2) | 25.8 (18.9) | 28.2 (23.5) | 28.7 (24.0) |
| Elongation (%) | 485 (510) | 495 (450) | 480 (425) | 480 (470) | 465 (415) | 475 (430) |
| % retention tensile strength | 99 (93) | 98 (91) | 99 (80) | 100 (90) | 98 (92) | 99 (94) |
| % 100% modulus increase | +54 (+23) | +45 (+10) | +44 (+20) | +47 (+19) | +38 (+23) | +30 (+16) |

TABLE 14

Table 14 lists the mechanical properties of the vulcanizates cured at 150° C. for $t_{90}$ and for 60 minutes and subsequently aged for 3 days at 100° C. Values in parentheses designate the values obtained for the vulcanizates cured at 150° C. for 60 min.

| Test | D | E | F | G | 4 | 5 |
|---|---|---|---|---|---|---|
| Modulus 50% (MPa) | 1.9 (1.6) | 2.0 (2.0) | 2.1 (1.8) | 2.1 (1.8) | 2.1 (2.0) | 2.2 (2.2) |
| Modulus 100% (MPa) | 3.6 (2.9) | 4.0 (3.9) | 4.3 (3.4) | 4.3 (3.3) | 4.0 (3.3) | 4.2 (3.8) |
| Modulus 300% (MPa) | 15.7 (13.0) | 17.5 (17.0) | 18.4 (15.2) | 17.9 (14.9) | 17.6 (15.7) | 18.3 (16.2) |
| Tensile str. (MPa) | 22.6 (18.9) | 23.0 (21.4) | 22.3 (19.5) | 22.6 (19.5) | 24.3 (21.9) | 24.4 (22.7) |
| Elongation (%) | 430 (410) | 400 (380) | 400 (405) | 395 (430) | 380 (375) | 390 (380) |
| % retention tensile strength | 81 (74) | 81 (79) | 81 (76) | 82 (74) | 82 (78) | 83 (79) |
| % 100% modulus increase | +48 (+40) | +58 (+58) | +52 (+36) | +52 (+37) | +46 (+22) | +36 (+25) |

TABLE 15

Table 15 lists the mechanical properties of the vulcanizates cured at 170° C. for $t_{90}$ and for 60 minutes and subsequently aged for 3 days at 100° C. Values in parentheses designate the values obtained for the vulcanizates cured at 170° C. for 60 min.

| Test | D | E | F | G | 4 | 5 |
|---|---|---|---|---|---|---|
| Modulus 50% | 2.1 (1.4) | 2.1 (1.8) | 2.1 (1.6) | 2.0 (1.5) | 2.1 (1.8) | 2.3 (1.9) |
| Modulus 100% (MPa) | 4.1 (2.5) | 4.2 (3.3) | 4.2 (2.9) | 4.0 (2.6) | 4.3 (3.5) | 4.4 (3.6) |
| Modulus 300% (MPa) | 17.5 (11.1) | 17.9 (14.4) | 17.9 (12.3) | 17.2 (12.3) | 17.4 (14.9) | 17.7 (15.4) |
| Tensile str. (MPa) | 23.1 (14.8) | 24.3 (18.7) | 22.2 (16.1) | 22.2 (16.0) | 25.4 (19.7) | 25.5 (19.9) |
| Elongation (%) | 415 (405) | 405 (385) | 390 (395) | 405 (410) | 385 (345) | 390 (385) |
| % retention tensile strength | 87 (75) | 87 (79) | 83 (75) | 86 (76) | 88 (77) | 88 (78) |
| % 100% modulus increase | +87 (+52) | +86 (+36) | +67 (+46) | +57 (+38) | +60 (+38) | +58 (+34) |

The results in Tables 12–15 make it clear that even after ageing the compositions according to the invention show improved basic properties in the ultimate vulcanizates. More particularly, the compositions of the present invention show a retention of the modulus during overcure and improvement in tensile strength. Especially the retention of the tensile strength is noteworthy.

TABLE 16

Table 16 lists the hot tensile strength in MPA measured at 100° C. of the vulcanizates.

| Test | D | E | F | G | 4 | 5 |
|---|---|---|---|---|---|---|
| 150° C./$t_{90}$ | 23.4 | 22.9 | 23.0 | 22.7 | 23.8 | 23.9 |
| 150° C./60 min. | (20.1) | (20.7) | (20.0) | (20.1) | (21.9) | (22.0) |
| 170° C./$t_{90}$ | 22.7 | 22.4 | 21.5 | 22.0 | 23.5 | 23.7 |
| 170° C./60 min. | (17.5) | (18.6) | (17.6) | (17.8) | (19.7) | (19.8) |

The hot tensile strength of the compositions of the present invention is clearly improved over the comparative compositions, especially after overcure.

Tables 17–20 show the results of the dynamic mechanical analyses of the compositions of the present invention 4 and 5 compared to the comparative compositions D–G.

TABLE 17

Dynamic-mechanical data of the compositions cured at 150° C. for $t_{90}$ and for 60 min. obtained at 60° C. and 15 Hz. Values in parentheses designate the properties of the compositions cured at 150° C. for 60 min.

| Samples | G' MPa | G" MPa | tanδ | J" MPa$^{-1}$ |
|---|---|---|---|---|
| D | 6.35 | 0.98 | 0.155 | 0.0238 |
|   | (5.76) | (1.06) | (0.184) | (0.0310) |
| E | 6.61 | 1.11 | 0.167 | 0.0246 |
|   | (6.53) | (1.13) | (0.173) | (0.0257) |
| F | 6.77 | 1.07 | 0.158 | 0.0233 |
|   | (6.18) | (1.16) | (0.187) | (0.0303) |
| G | 6.74 | 1.05 | 0.157 | 0.0232 |
|   | (5.82) | (1.13) | (0.194) | (0.0333) |
| 4 | 6.44 | 0.90 | 0.139 | 0.0223 |
|   | (6.25) | (0.80) | (0.127) | (0.0204) |
| 5 | 6.99 | 0.95 | 0.136 | 0.0195 |
|   | (6.89) | (0.85) | (0.123) | (0.0181) |

TABLE 18

Dynamic-mechanical data of the compositions cured at 170° C. for $t_{90}$ and for 60 min. obtained at 60° C. and 15 Hz. Values in parentheses designate the properties of the compositions cured at 170° C. for 60 min.

| Samples | G' MPa | G" MPa | tanδ | J" MPa$^{-1}$ |
|---|---|---|---|---|
| D | 5.66 | 0.93 | 0.164 | 0.0281 |
|   | (5.12) | (1.16) | (0.224) | (0.0437) |
| E | 5.96 | 0.98 | 0.165 | 0.0269 |
|   | (6.13) | (1.05) | (0.170) | (0.0265) |
| F | 5.91 | 0.95 | 0.161 | 0.0273 |
|   | (5.26) | (1.14) | (0.216) | (0.0412) |
| G | 6.26 | 1.06 | 0.169 | 0.0271 |
|   | (5.27) | (1.04) | (0.197) | (0.0360) |
| 4 | 6.48 | 1.03 | 0.159 | 0.0239 |
|   | (6.32) | (0.98) | (0.156) | (0.0248) |
| 5 | 6.89 | 1.08 | 0.157 | 0.0222 |
|   | (6.84) | (1.07) | (0.157) | (0.0230) |

TABLE 19

Dynamic-mechanical data of the compositions cured at 150° C. for $t_{90}$ and for 60 min. obtained at 20° C. and 1 Hz. Values in parentheses designate the properties of the compositions cured at 150° C. for 60 min.

| Samples | G' MPa | G" MPa | tanδ | J" MPa$^{-1}$ |
|---|---|---|---|---|
| D | 8.07 | 1.36 | 0.169 | 0.0203 |
|   | (7.52) | (1.39) | (0.185) | (0.0238) |
| E | 8.78 | 1.51 | 0.172 | 0.0190 |
|   | (8.25) | (1.48) | (0.178) | (0.0210) |
| F | 8.32 | 1.33 | 0.159 | 0.0187 |
|   | (8.16) | (1.48) | (0.181) | (0.0215) |
| G | 8.39 | 1.34 | 0.160 | 0.0185 |
|   | (7.60) | (1.33) | (0.175) | (0.0223) |
| 4 | 9.07 | 1.43 | 0.158 | 0.0174 |
|   | (9.12) | (1.47) | (0.162) | (0.0176) |
| 5 | 9.11 | 1.44 | 0.159 | 0.0170 |
|   | (9.22) | (1.40) | (0.151) | (0.0161) |

TABLE 20

Dynamic-mechanical data of the compositions cured at 170° C. for $t_{90}$ and for 30 min. obtained at 20° C. and 1 Hz. Values in parentheses designate the properties of the compositions cured at 170° C. for 30 min.

| Samples | G' MPa | G" MPa | tanδ | J" MPa$^{-1}$ |
|---|---|---|---|---|
| D | 7.30 | 1.25 | 0.172 | 0.0230 |
|   | (7.08) | (1.50) | (0.213) | (0.0288) |
| E | 7.75 | 1.37 | 0.176 | 0.0221 |
|   | (8.12) | (1.46) | (0.179) | (0.0214) |
| F | 7.26 | 1.16 | 0.160 | 0.0216 |
|   | (6.84) | (1.42) | (0.208) | (0.0292) |
| G | 7.83 | 1.23 | 0.157 | 0.0196 |
|   | (7.10) | (1.32) | (0.186) | (0.0253) |
| 4 | 8.11 | 1.40 | 0.174 | 0.0209 |
|   | (8.21) | (1.48) | (0.180) | (0.0219) |
| 5 | 8.41 | 1.46 | 0.173 | 0.0206 |
|   | (8.39) | (1.40) | (0.169) | (0.0199) |

From the results in Tables 19 and 20 it is clear that the use of the compositions of the present invention in tires improves several properties. This is especially shown for the loss compliance which is decreased significantly for the compositions of the present invention, resulting in a reduced rolling resistance. The changes produced by overcure are minimized with the compositions of the present invention.

EXAMPLES 6–8 AND COMPARATIVE EXAMPLES H–J

Natural rubber was vulcanized using formulations listed in Table 21. Comparative Example H was a control example with no anti-reversion coagent or sulfide resin.

TABLE 21

| Example No. | H | I | J | 6 | 7 | 8 |
|---|---|---|---|---|---|---|
| NR SMR CV | 100 | 100 | 100 | 100 | 100 | 100 |
| C. Black (N-330) | 50 | 50 | 50 | 50 | 50 | 50 |
| Zinc Oxide | 5 | 5 | 5 | 5 | 5 | 5 |
| Stearic Acid | 2 | 2 | 2 | 2 | 2 | 2 |
| Ar. Oil | 3 | 3 | 3 | 3 | 3 | 3 |
| CBS | 1.5 | 1.5 | 1.5 | 1.5 | 1.5 | 1.5 |
| Sulfur | 1.5 | 1.5 | 1.5 | 1.5 | 1.5 | 1.5 |
| BCI-MX | — | 0.5 | — | 0.5 | 0.5 | 0.5 |

TABLE 21-continued

| Example No. | H | I | J | 6 | 7 | 8 |
|---|---|---|---|---|---|---|
| Thiokol ® FA | — | — | 1.0 | 1.0 | 2.0 | — |
| Thiokol ® ST | — | — | — | — | — | 1.0 |

Zinc Oxide: zinc oxide harzsiegel standard
Ar. Oil: aromatic oil Ingralen 150 ®
CBS: Perkacit CBS grs ®: n-cyclohexyl-2-benzothiazole sulfenamide
BCI-MX: N,N'-m-xylylene-bis-citraconimide
Thiokol ® FA: ethyleneformal-polysulfide polymer (density 1.34 g/cc)
Thiokol ® ST: condensation product of (2-chloroethyl)formal and $Na_2Sx$ (specific gravity 1.29) [—$CH_2$(Cl)—$CH_2$—O—$CH_2$—O—$CH_2$—$CH_2$—$S_x$—$CH_2$—$CH_2$—O—]

Table 22 lists the cure characteristics of the compositions H–J and 6–8 obtained at 150° C. and 170° C. Values in parentheses designate the values obtained for the vulcanizates cured at 170° C.

TABLE 22

| Example No. | H | I | J | 6 | 7 | 8 |
|---|---|---|---|---|---|---|
| Extent of crosslinking,R∞ (Nm) | 1.8 (1.6) | 1.7 (1.6) | 1.8 (1.7) | 1.9 (1.8) | 1.9 (1.7) | 1.7 (1.6) |
| Scorch safety, $t_s2$ (min) | 5.5 (1.5) | 5.5 (1.5) | 5.4 (1.5) | 5.2 (1.4) | 5.0 (1.5) | 5.4 (1.6) |
| Optimum cure time, $t_{90}$ (min) | 9.4 (2.5) | 9.6 (2.5) | 11.2 (2.7) | 12.6 (2.8) | 19.0 (3.1) | 11.2 (2.6) |

The vulcanized rubbers were then tested for physical and mechanical properties. Tables 23–28 show the properties of the vulcanizates after optimum cure and overcure and aged for 1 or 3 days at 100° C. in air. The dynamic mechanical data are listed in Tables 29–32.

As will be noted from the results listed in these Tables, the physical and mechanical properties of the vulcanizates of the present invention, comprising Thiokol® FA or ST, are constant or slightly improved. See for example the retention of modulus at 170° C., the reduction in abrasion at overcure and the reduction in heat build up signifying an improved heat resistance.

In addition, the dynamic mechanical data are unexpectedly and significantly improved. The tests are performed at −20° C., 1 Hz and 60° C., 15 Hz. Loss modulus (G") measured at −20° C. is increased leading to an improvement of tire properties such as wet grip or skid resistance (Tables 31–32). A lower loss compliance (tanδ/G'=J") is shown in all four Tables, leading to improved tire properties such as reduced rolling resistance, resulting in fuel savings during service. Accordingly, the dynamic mechanical data show that the compositions of the present invention may be used with significant advantages in tires.

TABLE 23

Table 23 lists the properties of the vulcanizates cured at 150° C. for $t_{90}$ and for 60 minutes. Values in parentheses designate the values obtained for the vulcanizates cured at 150° C. for 60 min.

| Test | H | I | J | 6 | 7 | 8 |
|---|---|---|---|---|---|---|
| Modulus 50% (MPa) | 1.7 (1.6) | 1.6 (1.7) | 1.7 (1.6) | 1.7 (1.7) | 1.6 (1.9) | 1.6 (1.7) |
| Modulus 100% (MPa) | 3.5 (3.3) | 3.2 (3.3) | 3.4 (3.2) | 3.3 (3.4) | 3.2 (4.0) | 3.2 (3.3) |
| Modulus 300% (MPa) | 17.7 (16.8) | 16.9 (17.1) | 16.9 (16.4) | 17.4 (17.5) | 16.6 (19.8) | 16.2 (16.3) |
| Tensile str. (MPa) | 29.3 (27.1) | 28.6 (27.0) | 28.8 (26.2) | 29.3 (26.5) | 29.0 (27.5) | 29.5 (26.0) |
| Hot tensile (MPa) | 22.6 (19.5) | 21.6 (20.3) | 21.0 (18.3) | 22.1 (20.1) | 20.8 (19.6) | 21.5 (19.8) |
| Elongation (%) | 475 (450) | 485 (445) | 500 (440) | 480 (415) | 500 (425) | 485 (430) |
| Hardness (IRHD) | 74 (72) | 74 (74) | 73 (72) | 73 (73) | 73 (74) | 72 (72) |
| Rebound resilience (%) | 40 (37) | 37 (37) | 39 (37) | 39 (38) | 38 (37) | 39 (39) |
| Abrasion ($mm^3$) | 119 (125) | 112 (117) | 110 (115) | 117 (102) | 116 (106) | 111 (103) |
| Heat build up, 100° C. (ΔT, °C). | 22 (26) | 21 (17) | 20 (16) | 19 (14) | 18 (14) | 18 (14) |
| Permanent set (%) | 8 (5) | 8 (4) | 9 (5) | 10 (4) | 8 (4) | 9 (4) |

TABLE 24

Table 24 lists the properties of the vulcanizates cured at 170° C. for $t_{90}$ and for 30 minutes. Values in parentheses designate the values obtained for the vulcanizates cured at 170° C. for 30 min.

| Test | H | I | J | 6 | 7 | 8 |
|---|---|---|---|---|---|---|
| Modulus 50% (MPa) | 1.7 (1.3) | 1.6 (1.4) | 1.7 (1.4) | 1.7 (1.6) | 1.6 (1.6) | 1.6 (1.5) |
| Modulus 100% (MPa) | 2.9 (2.4) | 3.1 (2.7) | 3.0 (2.9) | 3.1 (3.1) | 3.0 (3.1) | 2.7 (2.8) |
| Modulus 300% (MPa) | 15.5 (13.1) | 16.1 (14.6) | 15.3 (14.9) | 16.0 (16.0) | 16.1 (16.2) | 14.7 (14.8) |
| Tensile str. (MPa) | 28.2 (24.0) | 27.5 (25.5) | 28.6 (24.2) | 28.8 (25.4) | 28.2 (25.5) | 28.5 (25.2) |
| Hot tensile (MPa) | 21.5 (17.6) | 21.5 (19.5) | 20.7 (17.8) | 21.5 (19.2) | 20.8 (18.9) | 21.5 (19.4) |
| Elongation (%) | 500 (485) | 485 (465) | 500 (455) | 505 (420) | 475 (400) | 500 (415) |
| Hardness (IRHD) | 71 (68) | 71 (70) | 71 (69) | 71 (71) | 71 (71) | 70 (70) |
| Rebound resilience (%) | 39 (35) | 36 (36) | 40 (36) | 40 (38) | 39 (38) | 40 (37) |
| Abrasion ($mm^3$) | 105 (193) | 118 (138) | 119 (161) | 114 (118) | 114 (127) | 115 (119) |
| Heat build up, 100° C. (ΔT, °C.) | 19 (28) | 18 (20) | 17 (20) | 16 (17) | 16 (17) | 16 (17) |
| Permanent set (%) | 7 (6) | 8 (5) | 9 (6) | 9 (5) | 10 (5) | 8 (5) |

TABLE 25

Table 25 lists the mechanical properties of the vulcanizates cured at 150° C. for $t_{90}$ and for 60 minutes and subsequently aged for 1 day at 100° C. in air. Values in parentheses designate the values obtained for the vulcanizates cured at 150° C. for 60 min.

| Test | H | I | J | 6 | 7 | 8 |
|---|---|---|---|---|---|---|
| Modulus 100% (MPa) | 4.0 (2.8) | 4.4 (3.3) | 4.5 (3.1) | 4.6 (3.4) | 4.5 (3.9) | 4.1 (3.4) |
| change in mod. (%) | +14 (−15) | +38 (0) | +32 (−14) | +39 (0) | +38 (−2) | +22 (+3) |
| Tensile str. (MPa) | 25.3 (17.5) | 25.9 (19.9) | 25.3 (19.2) | 25.5 (19.7) | 24.9 (20.3) | 25.5 (19.8) |
| change in t.s. (%) | −14 (−35) | −9 (−26) | −12 (−26) | −13 (−26) | −14 (−26) | −14 (−25) |
| Elongation (%) | 360 (365) | 380 (370) | 370 (370) | 370 (345) | 380 (325) | 360 (340) |

TABLE 25-continued

Table 25 lists the mechanical properties of the vulcanizates cured at 150° C. for $t_{90}$ and for 60 minutes and subsequently aged for 1 day at 100° C. in air. Values in parentheses designate the values obtained for the vulcanizates cured at 150° C. for 60 min.

| Test | H | I | J | 6 | 7 | 8 |
|---|---|---|---|---|---|---|
| change in | −24 | −22 | −26 | −20 | −24 | −26 |
| elong. (%) | (−19) | (−17) | (−16) | (−17) | (−20) | (−20) |

TABLE 26

Table 26 lists the mechanical properties of the vulcanizates cured at 170° C. for $t_{90}$ and for 30 minutes and subsequently aged for 1 day a at 100° C. in air. Values in parentheses designate the values obtained for the vulcanizates cured at 170° C. for 30 min.

| Test | H | I | J | 6 | 7 | 8 |
|---|---|---|---|---|---|---|
| Modulus 100% (MPa) | 3.8 (2.1) | 3.8 (2.7) | 4.1 (2.6) | 3.8 (3.0) | 3.8 (3.2) | 3.4 (2.9) |
| change in mod. (%) | +31 (−12) | +23 (0) | +37 (−13) | +23 (−3) | +26 (+3) | +26 (+3) |
| Tensile str. (MPa) | 23.9 (14.2) | 24.0 (16.3) | 24.4 (15.6) | 25.0 (17.8) | 25.2 (18.3) | 25.0 (18.3) |
| change in t.s. (%) | −15 (−23) | −13 (−26) | −13 (−39) | −13 (−30) | −11 (−25) | −13 (−32) |
| Elongation (%) | 390 (395) | 385 (360) | 370 (345) | 380 (335) | 375 (345) | 380 (330) |
| change in elong. (%) | −22 (−19) | −21 (−23) | −26 (−24) | −25 (−13) | −21 (−14) | −24 (−20) |

TABLE 27

Table 27 lists the mechanical properties of the vulcanizates cured at 150° C. for $t_{90}$ and for 60 minutes and subsequently aged for 3 days at 100° C. in air. Values in parentheses designate the values obtained for the vulcanizates cured at 150° C. for 60 min.

| Test | H | I | J | 6 | 7 | 8 |
|---|---|---|---|---|---|---|
| Modulus 100% (MPa) | 4.3 (2.8) | 4.6 (3.2) | 5.1 (2.9) | 4.8 (3.4) | 4.8 (3.8) | 4.7 (3.4) |
| change in mod. (%) | +34 (−15) | +44 (−3) | +50 (−19) | +45 (0) | +50 (−5) | +47 (+3) |
| Tensile str. (MPa) | 17.1 (13.5) | 18.3 (13.4) | 18.2 (12.4) | 18.9 (15.2) | 19.6 (15.4) | 19.2 (15.2) |
| change in t.s. (%) | −42 (−50) | −36 (−50) | −27 (−53) | −26 (−46) | −32 (−44) | −35 (−43) |
| Elongation (%) | 270 (335) | 275 (290) | 270 (285) | 255 (280) | 270 (265) | 270 (290) |
| change in elong. (%) | −43 (−26) | −43 (−35) | −46 (−35) | −45 (−33) | −46 (−35) | −47 (−29) |

TABLE 28

Table 28 lists the mechanical properties of the vulcanizates cured at 170° C. for $t_{90}$ and for 30 minutes and subsequently aged for 3 day at 100° C. in air. Values in parentheses designate the values obtained for the vulcanizates cured at 170° C. for 30 min.

| Test | H | I | J | 6 | 7 | 8 |
|---|---|---|---|---|---|---|
| Modulus 100% (MPa) | 4.2 (2.8) (2.2) | 4.6 (3.2) (2.7) | 4.7 (2.9) (2.7) | 4.7 (3.4) (3.0) | 4.5 (3.8) (3.1) | 4.0 (3.4) (2.7) |
| change in mod. (%) | +31 (−8) | +48 (0) | +57 (−10) | +52 (−3) | +50 (0) | +48 (−4) |
| Tensile str. (MPa) | 17.3 (10.3) | 17.2 (12.8) | 18.0 (11.2) | 18.9 (13.5) | 19.5 (13.7) | 18.8 (13.4) |
| change in t.s. (%) | −39 (−59) | −38 (−49) | −35 (−56) | −35 (−48) | −29 (−48) | −34 (−47) |

TABLE 28-continued

Table 28 lists the mechanical properties of the vulcanizates cured at 170° C. for $t_{90}$ and for 30 minutes and subsequently aged for 3 day at 100° C. in air. Values in parentheses designate the values obtained for the vulcanizates cured at 170° C. for 30 min.

| Test | H | I | J | 6 | 7 | 8 |
|---|---|---|---|---|---|---|
| Elongation (%) | 285 (335) | 265 (320) | 270 (300) | 260 (285) | 275 (280) | 285 (295) |
| change in elong. (%) | −43 (−31) | −45 (−31) | −46 (−34) | −49 (−34) | −43 (−30) | −41 (−29) |

TABLE 29

Dynamic-mechanical data of the compositions cured at 150° C. for $t_{90}$ and for 60 min. obtained at 60° C. and 15 Hz. Values in parentheses designate the properties of the compositions cured at 150° C. for 60 min.

| Samples | G' MPa | G" MPa | tanδ | J" MPa$^{-1}$ |
|---|---|---|---|---|
| H | 5.91 (6.32) | 0.77 (0.92) | 0.130 (0.146) | 0.0217 (0.0225) |
| I | 6.16 (6.05) | 0.88 (0.85) | 0.143 (0.140) | 0.0231 (0.0227) |
| J | 4.80 (5.88) | 0.62 (0.80) | 0.129 (0.136) | 0.0266 (0.0226) |
| 6 | 5.79 (5.88) | 0.65 (0.72) | 0.113 (0.122) | 0.0194 (0.0208) |
| 7 | 5.65 (5.75) | 0.60 (0.70) | 0.106 (0.122) | 0.0188 (0.0211) |
| 8 | 5.52 (6.32) | 0.60 (0.80) | 0.109 (0.127) | 0.0197 (0.0201) |

TABLE 30

Dynamic-mechanical data of the compositions cured at 170° C. for $t_{90}$ and for 30 min. obtained at 60° C. and 15 Hz. Values in parentheses designate the properties of the compositions cured at 170° C. for 30 min.

| Samples | G' MPa | G" MPa | tanδ | J" MPa$^{-1}$ |
|---|---|---|---|---|
| H | 5.05 (4.36) | 0.63 (0.77) | 0.125 (0.178) | 0.0243 (0.0396) |
| I | 5.22 (5.12) | 0.72 (0.78) | 0.139 (0.152) | 0.0261 (0.0297) |
| J | 5.03 (4.95) | 0.72 (0.78) | 0.143 (0.158) | 0.0284 (0.0318) |
| 6 | 5.36 (5.32) | 0.62 (0.69) | 0.116 (0.130) | 0.0216 (0.0240) |
| 7 | 5.40 (5.27) | 0.67 (0.68) | 0.124 (0.129) | 0.0229 (0.0244) |
| 8 | 5.16 (5.18) | 0.63 (0.65) | 0.122 (0.125) | 0.0236 (0.0242) |

TABLE 31

Dynamic-mechanical data of the compositions cured at 150° C. for $t_{90}$ and for 60 min. obtained at −20° C. and 1 Hz. Values in parentheses designate the properties of the compositions cured at 150° C. for 60 min.

| Samples | G' MPa | G" MPa | tanδ | J" MPa$^{-1}$ |
|---|---|---|---|---|
| H | 12.6 (13.1) | 2.01 (2.42) | 0.167 (0.183) | 0.0129 (0.0134) |
| I | 10.6 (13.0) | 1.82 (2.25) | 0.169 (0.173) | 0.0154 (0.0129) |

TABLE 31-continued

Dynamic-mechanical data of the compositions cured at 150° C. for $t_{90}$ and for 60 min. obtained at −20° C. and 1 Hz. Values in parentheses designate the properties of the compositions cured at 150° C. for 60 min.

| Samples | G' MPa | G" MPa | tanδ | J" MPa$^{-1}$ |
|---|---|---|---|---|
| J | 10.1 | 1.68 | 0.167 | 0.0161 |
|   | (13.0) | (2.17) | (0.177) | (0.0132) |
| 6 | 12.6 | 2.08 | 0.165 | 0.0127 |
|   | (12.6) | (2.10) | (0.168) | (0.0130) |
| 7 | 12.5 | 2.01 | 0.160 | 0.0124 |
|   | (12.2) | (2.03) | (0.166) | (0.0133) |
| 8 | 12.1 | 2.03 | 0.168 | 0.0135 |
|   | (13.3) | (2.31) | (0.174) | (0.0127) |

TABLE 32

Dynamic-mechanical data of the compositions cured at 170° C. for $t_{90}$ and for 30 min. obtained at −20° C. and 1 Hz. Values in parentheses designate the properties of the compositions cured at 170° C. for 30 min.

| Samples | G' MPa | G" MPa | tanδ | J" MPa$^{-1}$ |
|---|---|---|---|---|
| H | 10.5 | 1.70 | 0.162 | 0.0150 |
|   | (10.5) | (2.02) | (0.193) | (0.0177) |
| I | 10.7 | 1.80 | 0.168 | 0.0153 |
|   | (12.5) | (2.27) | (0.180) | (0.0139) |
| J | 11.2 | 1.93 | 0.171 | 0.0149 |
|   | (10.7) | (1.92) | (0.179) | (0.0161) |
| 6 | 10.4 | 1.71 | 0.164 | 0.0154 |
|   | (11.9) | (2.01) | (0.169) | (0.0138) |
| 7 | 11.4 | 1.88 | 0.165 | 0.0141 |
|   | (11.5) | (2.05) | (0.177) | (0.0148) |
| 8 | 11.0 | 1.83 | 0.166 | 0.0147 |
|   | (12.0) | (2.18) | (0.179) | (0.0143) |

What is claimed is:

1. A vulcanized rubber composition which comprises the vulcanization reaction product of:
   A) 100 parts by weight of at least one natural or synthetic rubber;
   B) 0 to 25 parts by weight of sulfur and/or sufficient amount of a sulfur donor to provide the equivalent to 0 to 25 parts by weight or sulfur;
   C) 0.1 to 5 parts by weight of at least one anti-reversion coagent comprising at least two groups selected from citraconimide and/or itaconimide groups; and
   D) 0.1 to 25 parts by weight of at least one sulfide resin of the general formula

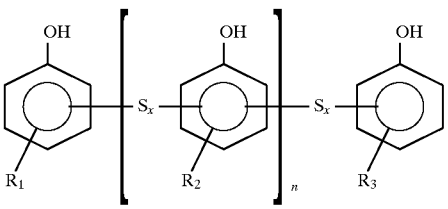

wherein $R_1$, $R_2$, and $R_3$ are independently selected from linear or branched $C_{1-10}$ alkyl groups, each x is independently selected from an integer of 1 to 10; and n is an integer from 1 to 100.

2. The composition of claim 1 wherein $R_1$, $R_2$ and $R_3$ are tertiary alkyl groups, meta- or para-substituted on the aromatic group with respect to the hydroxy group.

3. The composition of claim 2 wherein the sulfide resin is a para-tertiary alkyl phenol sulfide.

4. The composition of claim 1 wherein 0.1 to 25 parts by weight of sulfur and/or sulfur donor, based on 100 parts of rubber, is present in the composition.

5. A process for the vulcanization, at a temperature of from 110° to 220° C. for up to 24 hours, of a vulcanizable composition comprising 100 parts of at least one natural or synthetic rubber, said process being carried out in the presence of 0.1 to 5 parts by weight of at least one anti-reversion coagent comprising at least two groups selected from citraconimide and/or itaconimide groups, and 0.1 to 25 parts by weight of at least one sulfide resin of the general formula

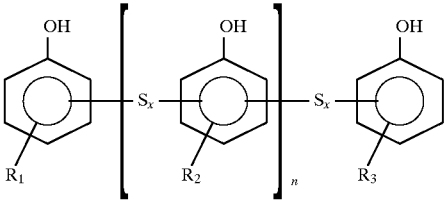

wherein $R_1$, $R_2$, and $R_3$ are independently selected from linear or branched $C_{1-10}$ alkyl groups, each x is independently selected from an integer of 1 to 10; and n is an integer from 1 to 100.

6. An article of manufacture comprising a rubber vulcanized by the process of claim 5.

\* \* \* \* \*